UNITED STATES PATENT OFFICE.

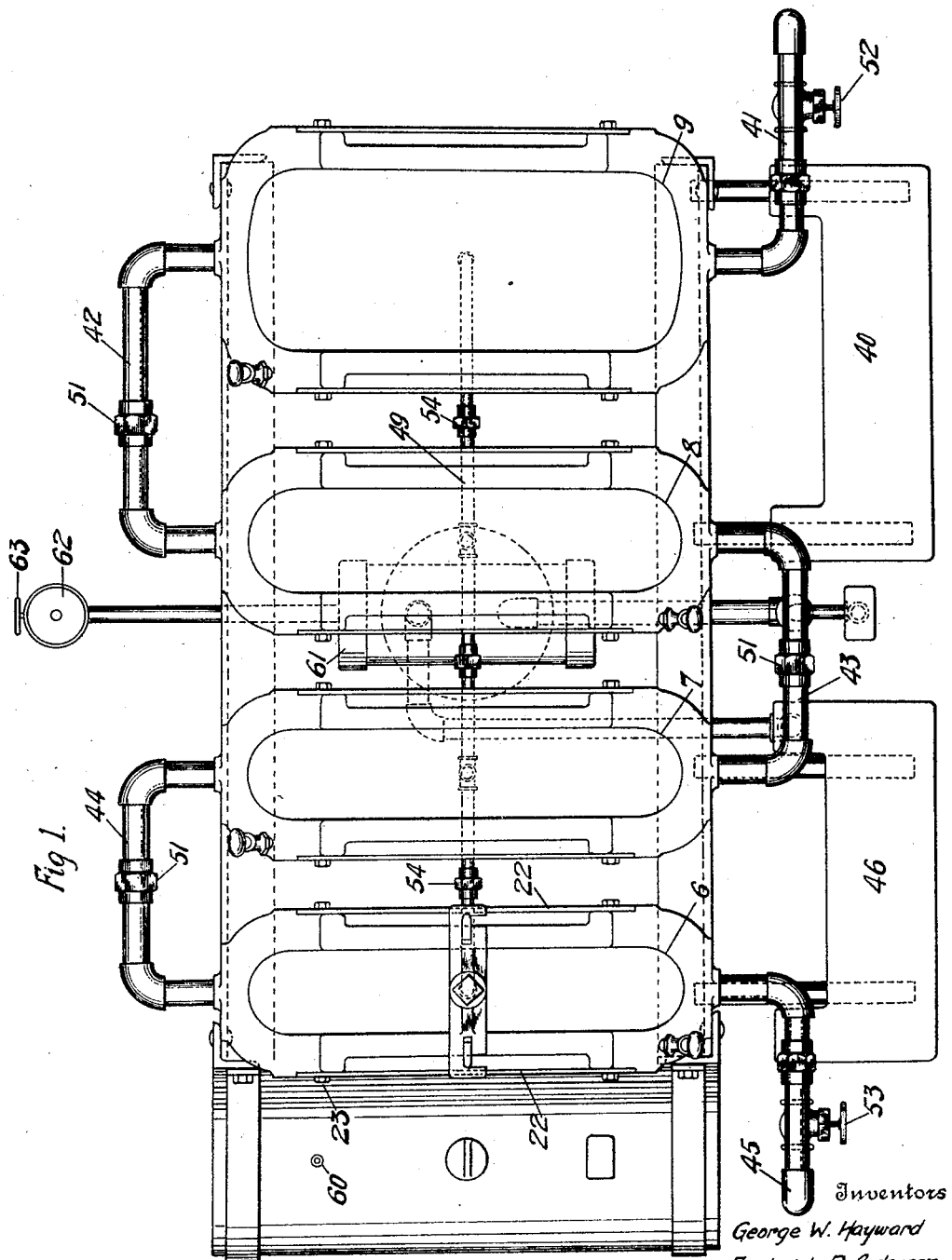

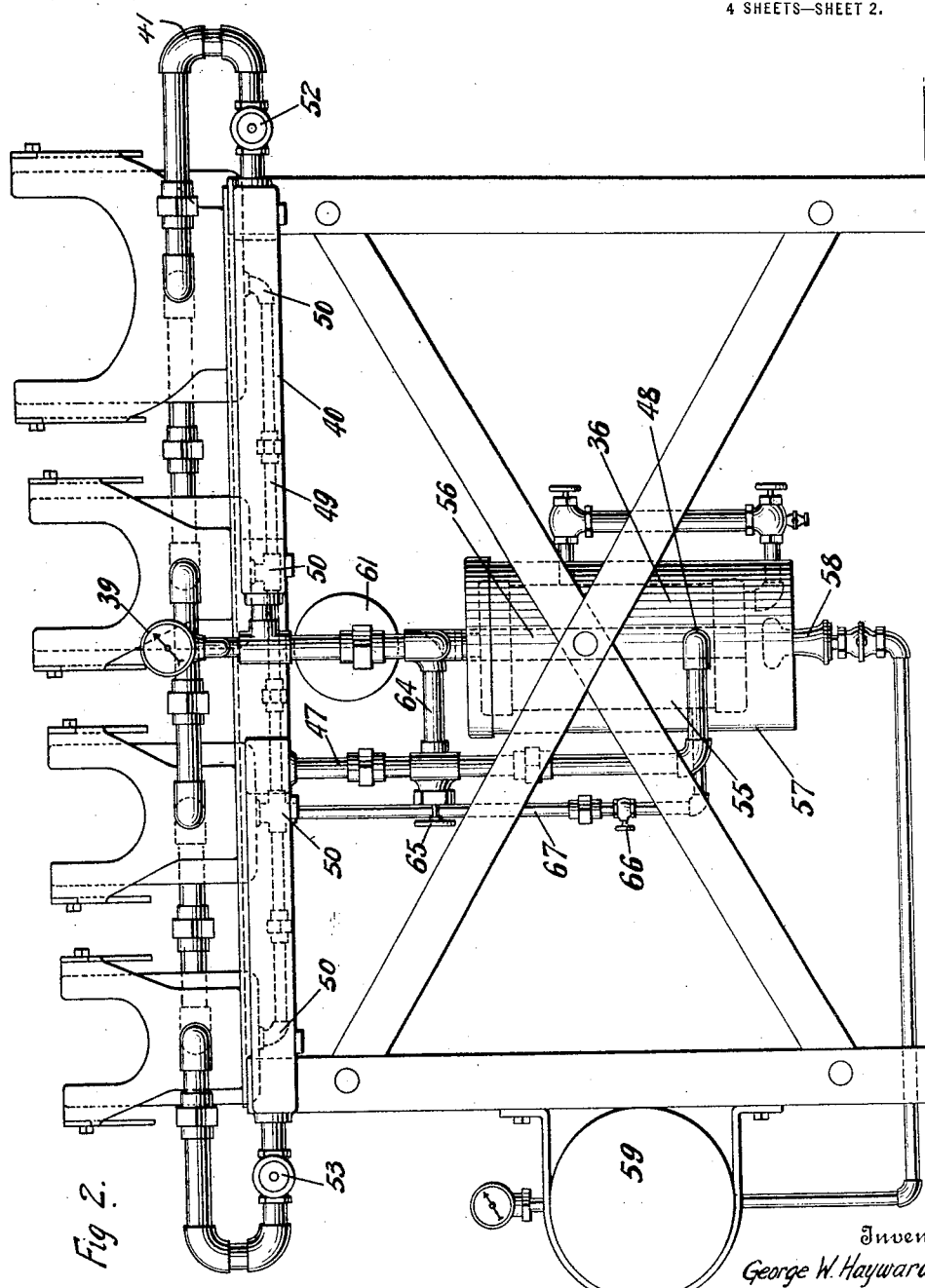

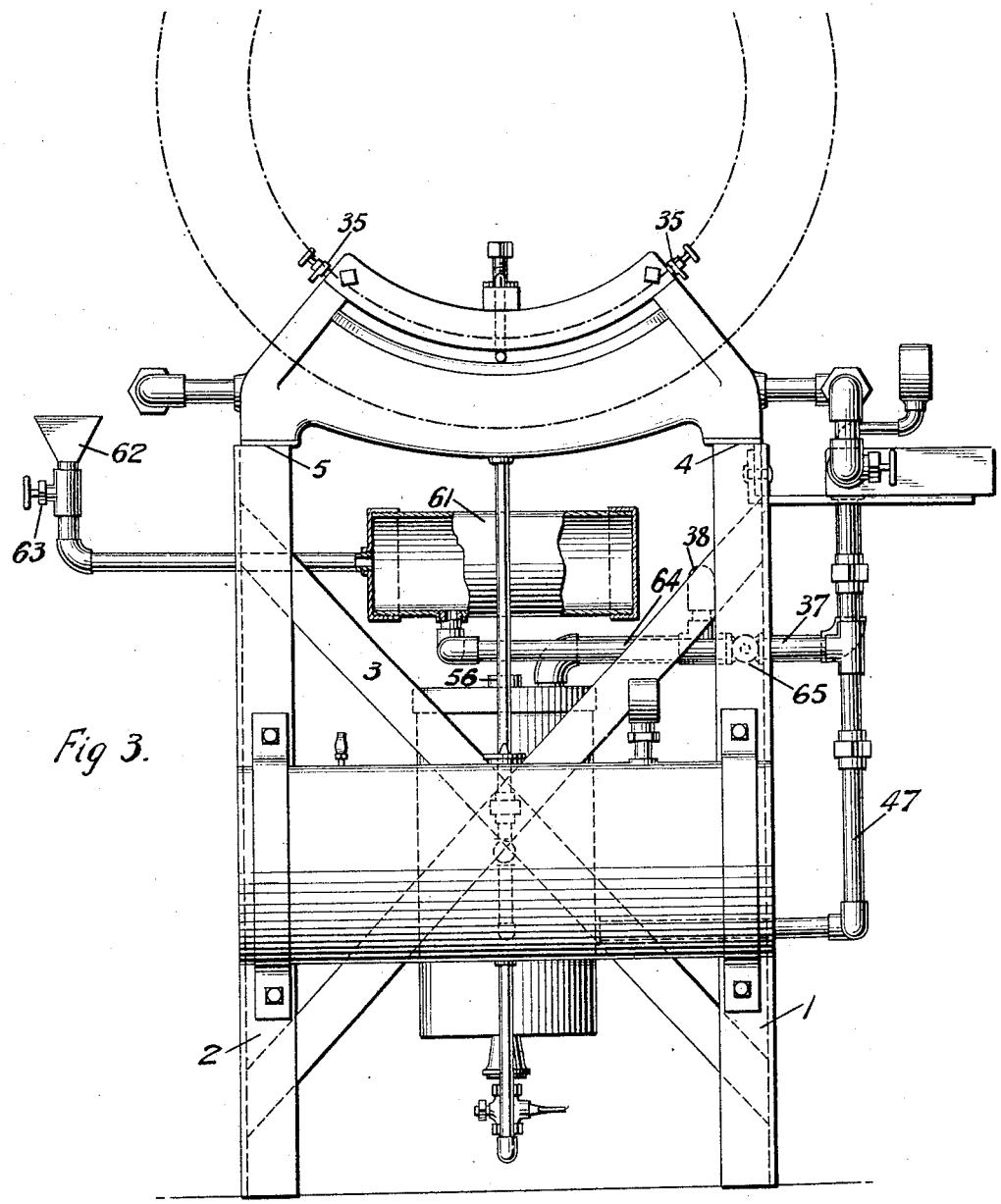

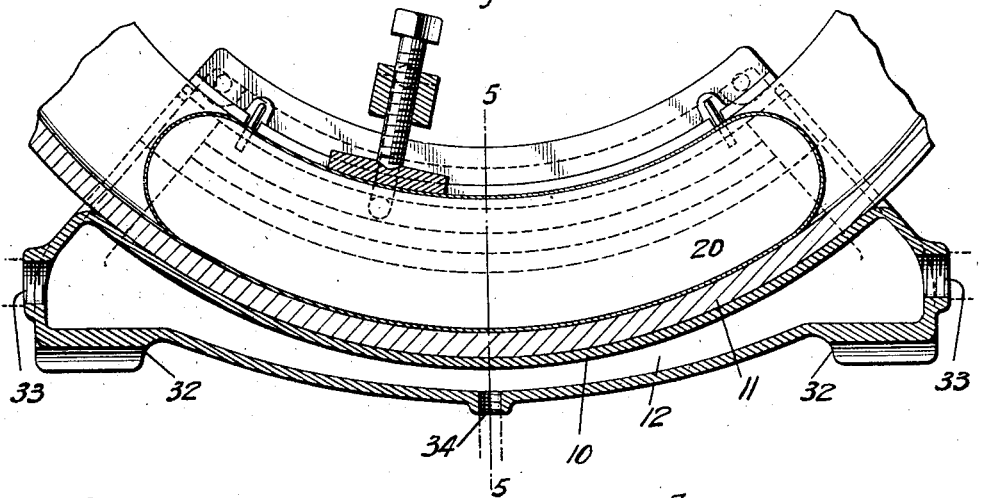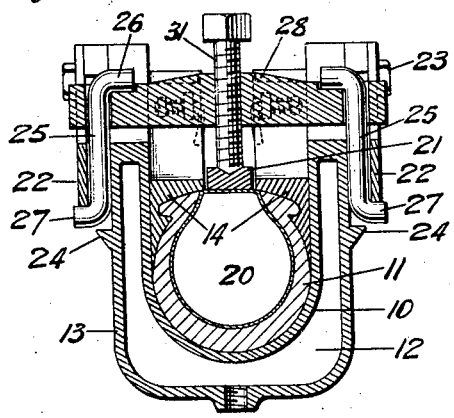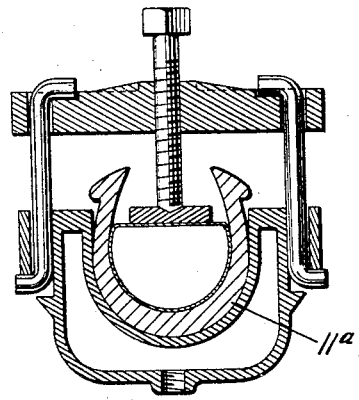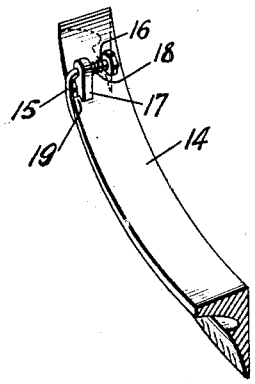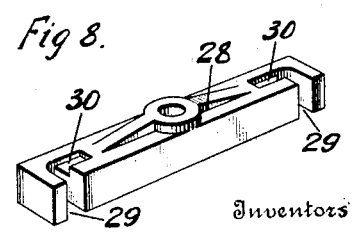

GEORGE W. HAYWARD AND FREDERICK P. ANDERSON, OF FLINT, MICHIGAN; SAID ANDERSON ASSIGNOR TO SAID HAYWARD.

VULCANIZING MACHINE.

1,404,120. Specification of Letters Patent. Patented Jan. 17, 1922.

Application filed September 13, 1921. Serial No. 500,285.

*To all whom it may concern:*

Be it known that we, GEORGE W. HAYWARD and FREDERICK P. ANDERSON, citizens of the United States, residing at Flint, in the county of Genesee and State of Michigan, have invented new and useful Improvements in Vulcanizing Machines, of which the following is a specification.

The present invention relates to improvements in steam vulcanizers and more particularly to those of the class adapted for use in repairing or retreading automobile or other vehicle tires.

One of the primary objects of the invention is to provide a novel and improved vulcanizer of this class whereby any selected or desired mold or set of molds may be interchangeably mounted and connected to receive steam from a common source, thus enabling a vulcanizer of one standard construction to be built and equipped initially with any desired sizes or kinds of molds to suit the requirements of the user, or the user may quickly and easily remove one mold and substitute a mold of another size or kind as may be required.

Another object of the invention is to provide tire repair or retreading molds with novel and improved clamps for securing and holding the tire in proper position and form during vulcanization, whereby the clamp of each mold may be set in the most advantageous position and, moreover, the operation of securing and releasing the clamp may be accomplished quickly and with facility, and to provide the tire repair molds with novel and improved bead molding members which can be applied to the tire with convenience and which are provided with devices for removably holding them in the desired positions on the beads of the tire casing.

Further objects of the invention are to provide improved means for supplying steam to the molds whereby uniform heating of each mold throughout its area is attained, to provide novel means for connecting the molds to the source of steam supply and to one another whereby substitution of one mold for another may be accomplished quickly and easily, and to provide a generally improved vulcanizer having a greater range of usefulness and an increased capacity for repair operations of various kinds.

To these and other ends, the invention consists in certain improvements and combinations and arrangements of parts, all as will be hereinafter more fully described, the features of novelty being pointed out particularly in the claims at the end of the specification.

In the accompanying drawings:

Figure 1 is a top plan view of a vulcanizer constructed in accordance with the preferred embodiment of the invention;

Figure 2 represents a front elevation of the vulcanizer constructed as shown in Figure 1;

Figure 3 represents an end elevation of the vulcanizer as viewed from the left in Figure 2;

Figure 4 is a detail view showing one of the tire repair molds in longitudinal section and illustrating the manner in which the tire to be repaired is applied and secured;

Figure 5 represents a cross-section through the mold on the line 5—5 of Figure 4;

Figure 6 represents a cross-section through a tire retreading mold illustrating the manner in which the tire to be retreaded is applied and held therein;

Figure 7 is a detail perspective view of one of the bead molding members; and

Figure 8 is a detail perspective view of one of the clamp members.

Similar parts are designated by the same reference characters in the several views.

The present invention is applicable either in whole or in part to steam vulcanizers of the types generally used for vulcanizing, retreading or otherwise repairing rubber tires of the kinds used on automobiles. The preferred embodiment of the invention is shown in the accompanying drawings and will be hereinafter described in detail. It is to be understood, however, that the invention is not restricted to the precise construction shown as equivalent constructions are contemplated and these will be included within the scope of the claims.

In the present instance, the vulcanizer comprises a suitable base composed preferably of front and rear legs 1 and 2 which may be advantageously constructed of angle iron and connected at the ends by suitable braces 3. The tops of these legs provide front and rear supports 4 and 5 on which the molds are adapted to rest. In the present instance, the vulcanizer is constructed to contain a set of four molds designated 6, 7, 8 and 9, each of these molds being of similar construction, although differing in size or shape to suit the requirements of the user. Each mold of the type employed for repairing or vulcanizing a sectional patch in a tire, consists, as shown in Figures 4 and 5, of a casting or block 10 having a segmental chamber 11 formed therein which conforms in shape and size with a section of the tire to be repaired, and this chamber 11 is surrounded at bottom and its two sides with a heating jacket 12 which is formed within the casting or block and is enclosed at its outer side by a wall 13. The top of the segmental chamber or mold cavity 11 is open in order that the tire may be inserted into and removed from the mold. In repairing or replacing a section of a tire, the repair work is done on the tire, while the latter is laid on a table or other support, after which the tire is introduced into the mold for the purpose of vulcanizing or curing the repair or section. Ordinarily, bead molding members are placed on the beads of the tire after the latter has been introduced into the mold, these bead molding members serving to maintain the beads of the tire in proper form, and where repairs are made on or adjacent to the beads, as is the case where repairs are made to remedy so-called "rim cuts," these bead molding members function to effect vulcanizing of the tire at or adjacent to the beads thereon. According to the present invention, bead molding members are provided which are equipped with means for holding them in proper position on the beads of the tire, so that these members may be applied to the tire prior to the introduction of the latter into the mold, and during the placing of the tire into the mold, these members will be retained in proper position. Preferably, and as shown, each bead molding member 14 which is shaped to conform with the size and shape of the tire bead and the portion of the tire adjacent thereto is provided with a clamp 15 which operates to grip the tire adjacent to the bead and to thus hold the bead molding member firmly in correct position on the tire. As shown, the clamp has a portion which is arranged to engage the inner side of the tire at the bead while the bead molding member fits against the opposite or outer side of the bead, this clamp having a shank 16 which extends slidably through a lug 17 on the member 14 and is provided with a spring 18 which acts to produce and maintain a clamping action between the clamp and the tire. The inner edge of the bead molding member 14 may be recessed, as at 19, to accommodate the tire-engaging portion of the clamp 15, so that the clamp may lie substantially flush with the inner edge of the bead-molding member. These bead molding members 14 are shaped to fit closely against the side walls of the chamber or cavity 11 of the mold, so that heat from the wall of this chamber or cavity will be transmitted through these members 14 to the tire bead and the portions of the tire adjacent thereto. A sand bag 20 is placed within the tire in the zone of the repair and after the tire with the bead molding members thereon and containing the sand bag has been placed in the mold, pressure is applied to the sand bag to expand the tire outwardly against the walls of the mold cavity. This pressure is applied preferably by a strip or block 21 which is curved longitudinally and is of a width to fit between the bead mold members 14 and to bear uniformly upon the sand bag 20.

The present invention provides novel and improved means for applying pressure to the sand bag and thus clamping the tire within the mold. Preferably, and as shown, in the present instance, the casting or block forming each mold is provided at its opposite sides with bars 22 which are curved preferably concentrically with the curvature of the mold cavity and are secured at their ends to the respective sides of the mold by screws 23 or equivalent means. Below each bar 22 the side of the mold is provided with a rib or ledge 24. A pair of links 25 having reversely offset or bent ends 26 and 27 are provided, these links being adjustable or shiftable in a direction longitudinally of the mold and in the spaces between the bars 22 and the respective sides of the mold. The lower offset ends of these links are adapted to engage the lower edges of the bars 22 and the ribs or ledges 24 on the respective sides of the mold are arranged to engage the lower ends 27 of the links and thereby prevent dropping of the links from operative position when the clamps are released. Each clamp comprises a cross member 28 which is adapted to span the top of the mold and is provided with slots 29 to receive the portions of the links 25 which project above the mold. The upper side of the cross member 28 is also provided adjacent to each of the slots 29 with a depression 30 which is adapted to receive the respective offset or laterally bent end 26 of the link. By this arrangement the cross member 28 may be easily and quickly applied to the mold by shifting the cross member laterally to engage the upwardly projecting portions of the links 25 in the slots 29, after which the links 25 may be rotated to bring their upper bent ends 26 to engage in the depressions 30 and thus lock them from rotation while at the same time the lower offset or bent ends of the links will be positioned to engage the lower edges of the bars 22. A clamping screw 31 is threaded through the cross member of the clamp and its lower end is arranged to bear on the strip or block 21. Tightening of the screw 31, therefore, acts to compress the sand bag within the tire, thus expanding the tire within the mold and the reaction from the screw is effectually sustained by the links 25. By arranging these links so that they may be adjusted in the spaces between the bars 22 and the adjacent sides of the mold, the clamp may be easily and quickly located at the most advantageous position longitudinally of the mold. Also, the construction described enables the clamp to be easily and quickly applied and removed after the tire has been placed in the mold and prior to removal of the tire from the mold.

Figure 6 shows in detail a cross-section of a tire re-treading mold, it having a tire-receiving cavity 11ª which is similar to the tire-receiving cavity 11 of the repair mold, as hereinbefore described, but in this instance, this cavity is of greater circumferential extent, in order that it may receive preferably about one-third of the circumference of a tire, and this cavity 11ª is shallower than the cavity 11, so that it does not receive the beads of the tire, it being unnecessary to vulcanize or cure the beads or the portion of the tire adjacent thereto during the retreading operation. For the same reason, the bead molding members are not necessary. The clamp and related means for expanding the tire within the mold is preferably the same as that described for the repair mold.

The present invention provides means by which a vulcanizer of a single or standard construction may be built initially and equipped with molds of any desired sizes or kinds or the user may subsequently substitute another mold or other molds of different sizes or kinds for those with which the machine is equipped. Preferably, and as shown, each mold is provided at or near its opposite ends with feet 32 which are adapted to rest on the supports 4 and 5 formed by the tops of the legs 1 and 2 of the framework, so that each mold is easily removable and means is provided for supplying steam to the molds, which means enables any one or more of the molds to be easily and quickly removed and substituted by another mold or other molds, and in the preferred construction, the steam supply means for the molds is so constructed that any one or more of the molds may be removed and replaced without the necessity of releasing or reducing the steam pressure in the source of steam supply of the vulcanizer. Moreover, the steam supply means, according to the present invention, is so connected to the molds that the heating effect is uniform, or substantially so, throughout the area of each mold. Preferably, the opposite ends of each mold are provided with steam connections 33, the bottom or lowest point in the jacket of each mold is provided with an outlet 34 for the water of condensation, and the highest points of the steam jacket of each mold are provided with air release valves 35, steam being supplied to one end of the mold through one of the passages 33, and after circulating or flowing longitudinally through the mold, passing out through the other steam passage 33 at its opposite end. The water of condensation flows from the heating jacket through the outlet 34 and in starting the vulcanizer into operation any air trapped in the upper portions of the mold heating jacket 12 is discharged through air release valves 35.

Steam is supplied to the molds by a steam boiler 36, the construction of which will be hereinafter described. Steam from this boiler flows through a main steam supply pipe 37 which is preferably provided with a pressure relief or safety valve 38 and a steam pressure gage 39. Steam from the pipe 37 flows preferably into one end of a tube vulcanizer 40 which is located at the front of the machine toward one end thereof, and the steam then flows from the opposite end of this tube vulcanizer through a pipe 41 and thence into one end of one of the molds. The steam after passing longitudinally through this mold, as hereinbefore described, discharges from the opposite end of such mold and then enters the adjacent end of the next mold in the set by way of a pipe 42, the remaining molds of the set being connected to receive the steam by the pipes 43 and 44. The steam discharging from the last mold of the set is conducted by a pipe 45 to one end of a second tube vulcanizer 46 located at the front of the machine and the steam from this vulcanizer is conducted by the pipe 47 back to the boiler 36 at a point 48 which is below the water line thereof. A relatively small pipe or manifold 49 extends beneath the molds and is connected by fittings 50 to the condensation outlets 34 of the different molds.

In order to enable any one or more of the molds to be easily and quickly removed and replaced by another mold or other molds, each of the pipes 42, 43 and 44 is provided with a coupling 51 of any suitable readily detachable type, it being preferable to permanently fit the sections of the pipes 42, 43 and 44 in the respective molds and to connect and disconnect these sections by the couplings 51. In order to enable any one of the molds to be removed or substituted without the necessity of releasing or reducing the steam pressure in the boiler, the pipes 41 and 45 are provided with cut-off or controlling valves 52 and 53, which valves may be closed preparatory to the removal of any one of the molds and opened after the substitution has been completed. The pipe or manifold 49 which receives the water of condensation from the molds is also preferably provided with couplings 54 which may be of any suitable readily detachable type, so that the condensation outlet for any one of the molds of the set may be readily disconnected to permit removal and the necessary connection made with the substituted mold.

The boiler 36 may be constructed in different ways, it comprising preferably a water-containing shell 55, which is preferably formed with a flue 56 extending vertically therethrough, the shell being preferably surrounded by an outer jacket 57. A suitable burner 58 is provided beneath the boiler and may burn either gas, where such is available, or it may use gasoline or other suitable oil as a fuel. In the latter instance, a tank 59 is provided to contain fuel oil, the tank having a fitting 60 thereon to receive air to produce the necessary pressure on the oil. The central vertical flue 56 of the boiler is preferably located directly beneath a feed water supply tank 61 which may have a filling funnel 62 connected thereto under control of a valve 63, the tank 61 being connected by a pipe 64 to the steam return pipe 47 under control of a valve 65. By this arrangement, heat from the flue 56 is utilized to pre-heat the water which is conveyed to the boiler to replace that lost by evaporation or leakage and this water may be fed to the boiler from time to time, as may be required, without the necessity of releasing the steam pressure from the boiler as the tank 61 may be filled with water through the funnel 62 by closing the valve 65 and opening the valve 63, after which the valve 63 is closed and water from the tank 61 may be fed to the boiler by opening the valve 65 which will cause the water to flow from the tank 61 into the boiler beneath it by gravity.

A valve 66 is preferably provided for the condensation return pipe 67 in order that the condensation collecting pipe or manifold may be cut off from the boiler while one of the molds is being removed or replaced.

The present invention provides a vulcanizer wherein the different molds are constructed and mounted as units, any one or more of which is or are interchangeable with another mold or other molds of different sizes or kinds, and any desired substitution of molds which may become necessary or desirable can be made easily and quickly. By this construction, the manufacturer is enabled to build a single or standard structure which can be completed by mounting the desired sizes and kinds of molds to meet the particular requirements of each user, and the user may easily and quickly substitute one or more other molds of different sizes or kinds to meet requirements, and hence one vulcanizer may be used for repairing blow-outs, rim cuts and other injuries to the body of the tire and also for retreading tires.

The present invention also facilitates the handling of the bead-molding members as they can be applied to the beads of the tire while the latter is removed from the mold and the clamps of the bead members will hold them in proper position on the tire.

The clamp arrangement provided by the present invention enables the securing and releasing of the tire in the mold to be accomplished easily and quickly and it also enables the requisite pressure to be applied to the tire at the most advantageous point to effect curing of the repair, and the construction of the mold is such that the tire can be heated and cured uniformly throughout its surface from bead to bead.

We claim as our invention:—

1. A steam vulcanizer comprising a support, a plurality of vulcanizing molds constructed as units each interchangeable with another mold of another size or kind, each mold having a steam supply inlet at one end and a steam outlet at its opposite end, a source of steam supply common to said molds, and means for interchangeably connecting the steam inlets and outlets of the molds to receive steam successively and in series from said common supply.

2. A steam vulcanizer comprising, in combination, a support, a set of vulcanizing molds individually and removably mounted thereon, each mold being interchangeable with another mold of another size or kind, and each mold having a steam inlet at one end and a steam outlet at its opposite end, a source of steam supply common to the set of molds, and connecting steam supply pipes connecting in series the steam inlets and outlets of the molds of the set and having detachable couplings uniting them.

3. A steam vulcanizer comprising, in combination, a set of molds, each having a steam inlet pipe connected to one end and a steam outlet pipe connected to the other end thereof, a steam boiler, steam supply pipes with detachable couplings connecting in series, the steam inlet and outlet pipes at the ends of the molds of the set, and condensation water pipes with detachable couplings also connecting the mold of the set, each mold of the set being removable as a unit independently of the other molds of the set for substitution by another mold.

4. A steam vulcanizer comprising, in combination, a set of independently-mounted molds, each having a longitudinal heating jacket, a steam boiler for supplying steam to the molds, steam supply pipes detachably connecting the ends of the longitudinal heating jackets of the molds in series with the boiler, and means for cutting off communication between the molds and the boiler preparatory to removal of any mold of the set.

5. A steam vulcanizer comprising, in combination, a set of molds having longitudinally-extending heating jackets, a steam boiler for supplying steam thereto, and means for conducting steam from the boiler successively and longitudinally through the series of heating jackets of the molds of the set.

6. A vulcanizer comprising, in combination, a base having spaced supports thereon, a set of molds having feet toward their ends which rest removably on said supports, the molds also having longitudinally extending heating jackets with steam entrances and exit passages located respectively at their opposite ends, and steam conducting pipes communicating with said steam passages and detachably connecting the molds of the series.

7. A vulcanizer comprising, in combination, a base having spaced supports thereon, a set of molds arranged in a row and having feet toward their ends which rest on said supports, the molds having longitudinally extending heating jackets with steam entrance and exit passages located respectively at their opposite ends, a steam boiler having steam supply and return pipes located toward the respective ends of said supports and connected to the molds at the respective ends of the row, and intercommunicating pipes connecting in series the steam entrance and exit passages of the molds of the set.

8. A steam vulcanizing mold comprising a segmental vulcanizing cavity or chamber, and a jacket enclosing the bottom and adjacent opposite sides of the cavity and extending longitudinally thereof, the jacket having steam entrance and exit passages at its respective opposite ends, and a condensation outlet located in the bottom of the jacket intermediately of its ends.

9. In a vulcanizer, the combination of a mold having a vulcanizing cavity and bars extending longitudinally at opposite sides thereof, and a clamp comprising a cross-member and compressing device, and links connected to the cross-member and adjustable longitudinally of said bars for setting the clamp in different positions relatively to the length of the cavity.

10. In a vulcanizer, the combination of a mold having a vulcanizing cavity, bars extending longitudinally and spaced from the opposite sides thereof, and ledges projecting outwardly from the sides of the mold below the respective bars, and a clamp embodying a cross-member and compressing device, and links held in cooperative relation with the bars by said ledges but adjustable longitudinally of the bars in the spaces between the latter and the respective sides of the mold.

11. The combination with a vulcanizing mold, of a clamp comprising a cross-member provided with a compressing device and having slots toward its ends and recesses in its upper side adjacent to said slots, and links rotatably connected to the mold and having offset portions arranged to be brought into line with the slots in the recesses by rotation thereof.

12. The combination with a vulcanizing mold having longitudinally extending bars spaced from its opposite sides, of a clamping device comprising a cross-member provided with a compressing device and having slots and recesses adjacent thereto, and a pair of links rotatably and longitudinally movable in the respective spaces between the bars and the sides of the mold, each link having an offset lower end movable to and from a position to engage the lower side of its respective bar, and having an offset portion on the upper end movable into line with the slot or the recess of the cross member by rotation of the link.

13. The combination with a vulcanizing mold having bars extending longitudinally and spaced from its opposite sides and provided with ledges which project outwardly at points below the lower edges of said bars, of a clamp for the mold comprising a cross-member provided with a clamping screw and having slots towards its ends, and links having reversely-bent upper and lower ends movable to and from operative relation with the slots of the cross member and the lower edges of the bars respectively by rotation of the links, the ledges supporting the lower ends of the links relatively to the bars.

14. A bead-molding member for tire-vulcanizing molds comprising a part to fit against one side of the tire bead and a clamping device to engage the opposite side of the tire bead and connected to said part to thus hold said member in position on the tire bead.

15. A bead-molding member for tire-vulcanizing molds comprising a part to fit against the outer side of the tire bead, and a spring clamp carried by said part and having a portion arranged to engage and grip the inner side of the tire bead to thus clamp and secure the member immovably thereon.

16. In a steam vulcanizer, the combination of a steam boiler having a flue for conducting products of combustion upwardly therethrough, and a water supply tank for the boiler located above it and in a position to be heated by the products of combustion from said flue.

In testimony whereof we have hereunto set our hands in presence of two subscribing witnesses.

GEORGE W. HAYWARD.
FREDERICK P. ANDERSON.

Witnesses:
GEORGE C. LOSS,
H. A. LOSS.